Aug. 25, 1959 W. F. STEAGALL 2,901,635
DELAY FLOP
Filed Sept. 24, 1954
FIG. 1.
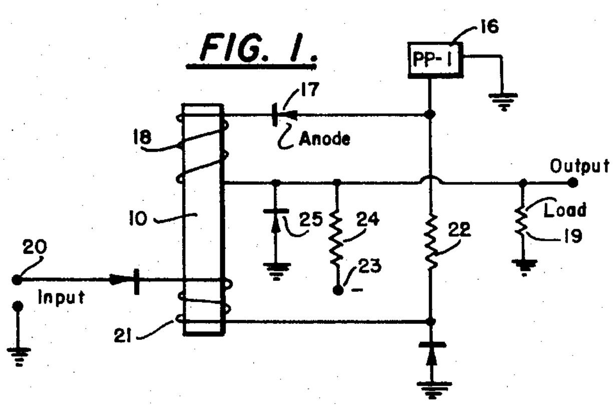
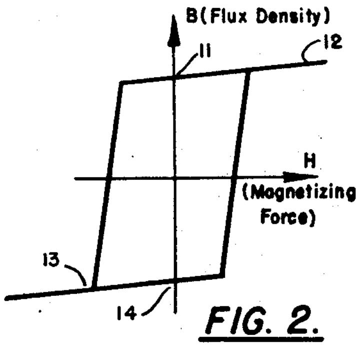
FIG. 2.
FIG. 3.
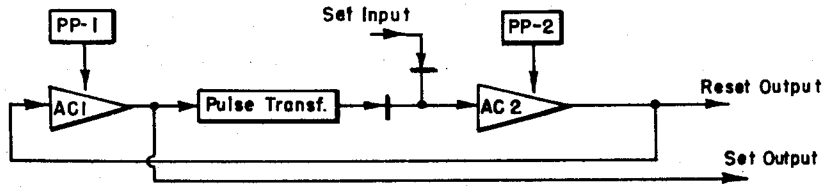
FIG. 4.
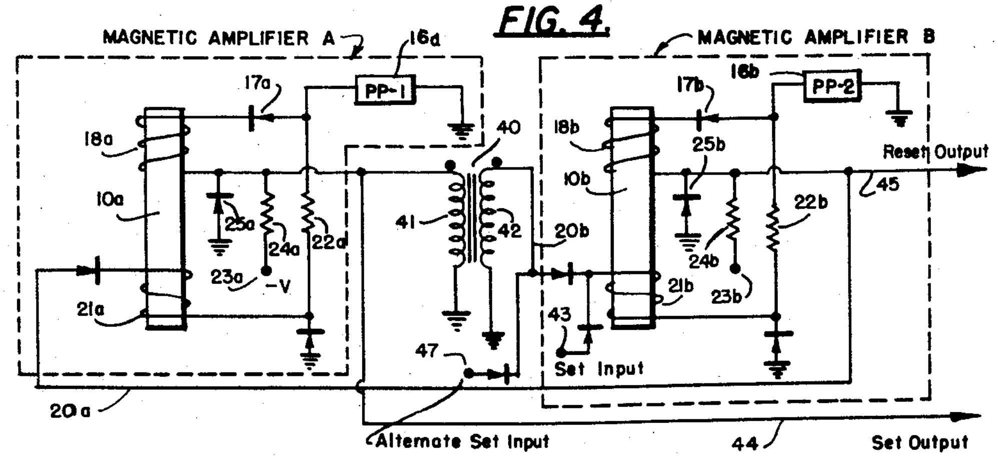
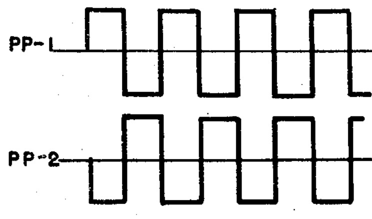
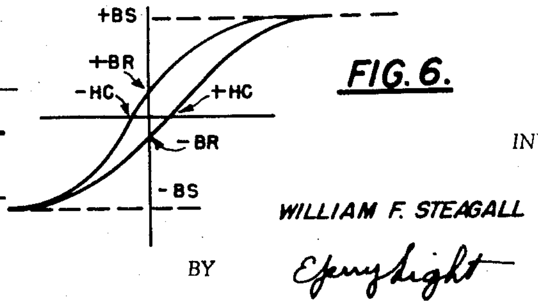
FIG. 6.
FIG. 5.
INVENTOR
WILLIAM F. STEAGALL
BY [signature]
ATTORNEY 2,901,635

DELAY FLOP

William F. Steagall, Merchantville, N.J., assignor, by mesne assignments, to Sperry Rand Corporation, New York, N.Y., a corporation of Delaware Application Septemer 24, 1954, Serial No. 458,079

18 Claims. (Cl. 307—88)

The present invention relates to "delay flops." A delay flop is a desirable element in certain computer circuits and is a device which upon receipt of a control signal or pulse produces an output signal of predetermined length, usually longer than, or delayed in time with respect to, said control signal, or one having a predetermined number of pulses.

A resettable delay flop is one in which the device will respond to a second input signal which arrives before the output, due to the first input signal, ceases. A non-resettable delay flop is one in which the device will not respond to a second input signal which arrives before the output, due to the first input signal, ceases. For example, in the case of a resettable delay flop a given input signal will produce an output that continues for a time period T following receipt of the input signal. A second control signal, received at the input prior to the expiration of the time T will cause the output to continue for a time period T following the second input signal. In a non-resettable delay flop such a second control signal would have no effect. The present invention is one of the non-resettable type, although it is possible within the broadest aspects of the invention to render the system resettable.

Delay flops are well known in the prior art, but have usually employed vacuum tube circuits. There are certain computer circuits such as those employing magnetic amplifiers, which cannot readily utilize the prior art types of delay flops which use vacuum tubes, and it is desirable therefore to provide a delay flop which can be conveniently used in connection with the latter type of computer circuits. It is also desirable to provide a delay flop which is much smaller in size than those employing vacuum tubes, as well as to provide a delay flop in which there are no parts which are likely to burn out, such as vacuum tubes. Reliability in service is a highly important factor in computer design.

In view of the foregoing, it is the primary object of this invention to provide a delay flop which overcomes the disadvantages of prior art delay flops that employ vacuum tubes.

It is a further object of the invention to provide an improved form of non-resettable delay flop, that may be used conveniently in a computer circuit.

Another object of the invention is to provide a delay flop of very small physical size.

An additional object of the invention is to provide a delay flop that is low in cost and yet effective.

A still further object of the invention is to provide a delay flop that is more reliable in operation than the prior art types employing vacuum tubes.

Yet another object of the invention is to provide a delay flop having the same advantages over conventional delay flops as magnetic amplifiers have over conventional vacuum tube circuit arrangements.

Yet another and broad object of the invention is to provide an electrical circuit having improved means for effectively timing a signal.

The invention in its preferred form employs two magnetic amplifiers, the output of each controlling the input to the other. Interposed between the output of one of the magnetic amplifiers and the input of the other is a transformer having a saturable core. The arrangement is such that the core is driven closer and closer to saturation each time a pulse from the output of the one magnetic amplifier is transmitted to the input of the other magnetic amplifier. After a predetermined number of such pulses, the core of the transformer will become saturated and no further effective pulses will be transmitted therethrough and consequently the output from the delay flop will cease. It follows that the delay flop will provide a given number of output pulses in response to and following each input to the delay flop as a whole.

A broad principle taught in the following specification is that means may be employed in conjunction with a source of spaced pulses for extending the decay time of the pulses so that the pulses overlap. This causes the amplitude of the pulses to progressively increase. If means, such as a saturable reactor, responds to the amplitude of the pulses it is possible to indicate or determine a time period. In the particular device hereinafter disclosed when the pulses reach a given amplitude a transformer is saturated and its output ceases. This in effect interrupts the feedback path interconnecting the magnetic amplifiers and terminates the train of pulses. Since the train of pulses is fed to the output circuit when the train of pulses ceases the output ceases. Hence, it is possible to provide a timed output following an input signal.

In the drawings:

Figure 1 is a schematic diagram of a complementing magnetic amplifier, series type, which is useful in connection with the invention.

Figure 2 is an idealized hysteresis loop of the core 10 of Figure 1.

Figure 3 is a block diagram of a delay flop embodying the invention.

Figure 4 is a schematic diagram of one circuit form corresponding to the block diagram of Figure 3.

Figure 5 is a waveform diagram showing the timing of the pulses of sources *16a* and *16b* of Figure 4.

Figure 6 is an idealized hysteresis loop for the core material of the transformer 40 of Figure 4.

The present invention may utilize magnetic amplifiers of the general types described in the following two applications: Theodore H. Bonn and Robert D. Torrey, Serial No. 408,858, filed January 8, 1954, now Patent No. 2,788,888, entitled "Signal Translating Device"; and John Presper Eckert, Jr. and Theodore H. Bonn, Serial No. 382,180, filed September 24, 1953, entitled "Signal Translating Device." These applications are assigned to the same assignee as is the present application.

Figure 1 is a schematic diagram of one type of magnetic amplifier that may be used in connection with the invention. The magnetic core 10 may be made of a variety of materials, among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 2). Cores of this character are now well known in the art. In addition to the wide variety of materials available, the core may be constructed in a number of geometries including both closed and open paths; for example, cup-shaped, strips, and toroidal-shaped cores are possible. Those skilled in the art understand that when the core is operating on the horizontal (or substantially saturated) portions of the hysteresis loop, the core is generally similar in operation to an air core in that the coil on the core is of low effective impedance. On the other hand, when the core is operating on the vertical (or unsaturated) portions of the hysteresis loop, the effective impedance of the coils on the core will be high.

The source 16, of power pulses PP–1, generates a train of equally spaced square wave pulses as shown in Figure 5. If it be assumed that at the beginning of any given pulse the core has residual magnetism and flux density as represented by the point 11 on the hysteresis loop of Figure 2, the power pulse will drive the core from point 11 to saturation region 12. At the conclusion of the pulse the magnetization will return to point 11. Successive pulses from power source 16 will flow through rectifier 17, coil 18 and load 19, repeatedly driving the core from remanence point 11 to saturation region 12. During the interval in which the core is being driven from 11 to 12, the core is operating on a relatively saturated portion of the hysteresis loop, whereby the effective impedance of coil 18 is low. Hence the power pulses will flow from source 16 to load 19 without substantial impedance. If, however, during the interval between two power pulses, a pulse is received at the input 20, it will pass through coil 21, resistor 22, source 16, to ground. This will magnetize the core negatively, driving it from point 11 to point 13. At the conclusion of this negative pulse the core will return to remanence point 14. The next power pulse from source 16 is just sufficient to drive the core from point 14 to point 15. Since this is a relatively unsaturated portion of the hysteresis loop, the coil 18 will have high impedance during this pulse and the current flow will be very low. At the conclusion of that pulse the magnetization will return to zero value 11. If no signal appears on the input immediately following the last-named power pulse, the next power pulse will drive the core to saturation at point 12 and will give a large output at the load 19.

Consequently, it is clear that the magnetic amplifier of Figure 1 will feed large pulses to the load in response to each pulse from source 16, except that immediately after the receipt of any pulse on the input 20 the next power pulse will be blocked. This type of a magnetic amplifier is known as a "complementing" one.

In order to avoid appearance at the load 19 of the small current which flows during the period that a power pulse is driving the core from point 14 to 15, the parts 23, 24 and 25 may be employed. The negative source 23 passes a current, greater than the said small current in coil 18 through resistor 24 and rectifier 25. Thus in the presence of the said small current, there is a net current in diode 25, and the cathode of 25 therefore remains substantially at ground potential.

In Figure 4 the two magnetic amplifiers A and B are identical with the magnetic amplifiers of Figure 1 and in fact similar parts bear like reference numbers, except that in connection with magnetic amplifier A of Figure 4 the reference numbers bear the subscript *a* and in connection with magnetic amplifier B of Figure 4 they bear the subscript *b*. The two power pulse generators **16*a*, PP–1, and 16*b*, PP–2, have waveforms as shown in Figure 5. Each of these generators produces a series of spaced pulses and the pulses of one generator appear during the spaces between pulses of the other generator. Although the pulse generators are shown in Figures 3 and 4 it will be understood that the device of Figures 3 and 4 in production need not itself include this equipment, but may be provided with terminals for connection to master pulse generators of desired phase. In the present device such terminals would be labeled 16*a* and 16*b* and be regarded as the source or sources of series of spaced pulses. Both forms are combinations within the spirit of this invention. If it be assumed that the device has been standing idle for some period of time with, however, the two power pulse generators 16*a* and 16*b*** running, the operation will be as follows.

No set input pulses having been received at terminal 43, no current will have been flowing in primary winding **21*b* and consequently the power pulses from source 16*b* will have been regularly flowing through rectifier 17*b*, coil 18*b*, to the reset output 45, and also to the input 20*a* of magnetic amplifier A. As there has been a continuous series of pulses applied to input 20*a*, which were flowing through coil 21*a*, resistor 22*a* and generator 16*a* to ground, the core 10*a* will have been reset during the spaces between each of the power pulses from source 16*a*. Consequently, the coil 18*a* will have had an effective high impedance and, therefore, very little current will flow from generator 16*a* through rectifier 17*a*, coil 18*a* and primary winding 41 of transformer 40** to ground.

The transformer 40 has a core of any suitable material, for example silicon steel, which has the property of being driven to saturation in step-by-step fashion in response to a series of pulses of progressively increasing amplitude flowing through the primary winding 41. Figure 6 is an idealized hysteresis loop for the core of transformer 40 although the invention is not limited to this particular hysteresis loop.

While the core of transformer 40 is operating on the unsaturated portion of the hysteresis loop, substantial current will be induced in the secondary winding 42, but when the core reaches saturation no further current is induced in the secondary winding 42. It will be understood that saturability of the core is selected to suit the particular application desired and may where circumstances permit be made adjustable to vary the length or number of pulses to be produced. Adjustability can be obtained by changing the effective value of a resistor connected to one of the windings or by moving the core with respect to the windings 41 and 42, changing cores, adding additional material to or removing material from the core.

If a set input pulse is received at terminal 43 during a space between two of the power pulses of generator **16*b*, it will flow through coil 21*b*, resistor 22*b* and generator 16*b* to ground. The input pulse will reset the core 10*b* during spaces between power pulses of generator 16*b* and stop the flow of output current to reset output 45 and to input 20*a* of magnetic amplifier A. When the reset current through coil 21*a* is stopped, current will flow from generator 16*a* through rectifier 17*a* and coil 18*a* to "set output" 44 as well as through the primary winding 41 of transformer 40**.

If it is assumed that prior to the first pulse through primary winding 41 the core is at region +Br on the hysteresis loop of Figure 6, the first pulse will not saturate the core but will cause a flow of current in primary winding 41. At the conclusion of the first pulse the field in the core will collapse and induce potential in primary winding 41 tending to render the upper end thereof negative. However, rectifier **25*a* will prevent the upper end of winding 41 from going negative; and hence it follows that the current in primary winding 41 will decrease, during the space between the first and second pulses therethrough, exponentially. The decay time of the first current pulse through winding 41 depends upon the inductance of winding 41 and the forward resistance of rectifier 25*a*. In fact, the decay time of the first pulse in winding 41 is so long that the current will not decay to zero prior to the receipt of the second pulse hereinafter mentioned. The first pulse through winding 41 will not only drive the core up the hysteresis loop but will induce a potential in secondary winding 42 since the core will then be operating on an unsaturated portion of its hysteresis loop during the period of the first pulse. The current induced in secondary winding 42 will from there flow through coil 21*b*, resistor 22*b* and generator 16*b* to ground. This current will reset the core 10*b*** during the spaces between power pulses of generator 16*b* and thus continue to maintain the zero output of magnetic amplifier B. Hence, there will be no reset current flowing through the coil 21*a* following the last mentioned pulse from generator 16*a* and consequently the next power pulse from generator 16*a* may likewise flow through coil 18*a*, the latter still having low impedance. This flow of current will create another pulse at the output 44 which will flow through primary winding 41 to move the core again along its hysteresis loop toward saturation. The current through primary winding 41 due to the first pulse will not have decayed to zero prior to receipt of the second pulse through that primary winding. Hence, the current in primary winding 41 during the period of the second pulse will be greater than that of the first pulse and will raise the core higher on the hysteresis loop. It too will find core 40 operating on an unsaturated portion of the hysteresis loop of Figure 6 and will induce a flow of current in secondary 42 which will pass through coil 21*b* and again reset the core 10*b* and maintain zero output at 45 and 20*a* and again prevent the flow of current through coil 21*a*. This action will again allow the next power pulse from source 16*a* to flow through coil 18*a* (this coil still having low impedance) to "set output" 44 and through primary winding 41. This third pulse through primary winding 41 will appear before the current in winding 41 due to the first and second pulses has completely decayed and at the beginning of the third pulse the current in winding 41 will be greater than it was at the beginning of the second pulse. Consequently the third pulse will drive the core still higher on the hysteresis loop than did the second pulse but since the core is still unsaturated there will be a current induced in secondary winding 42. This current induced in secondary winding 42 will flow through coil 21*b* and maintain zero output at terminal 45 and input 20*a* and again prevent flow of current in 21*a* which will allow the next power pulse in generator 16*a* to flow through coil 18*a* (which still has low impedance) to "set output" 44 and coil 41.

It is clear that each time there is a pulse in primary winding 41 the current in that winding will be greater than in the case of the previous pulse since the decay time of a current pulse in that winding is longer than the spaces between pulses. Consequently, ultimately, after a predetermined number of such current pulses through primary winding 41, the core will be driven to saturation at +B's of Figure 6. When this point is reached the core is essentially an air core and no potential is induced in secondary winding 42. Hence no current will flow in input coil 21*b*. As a consequence, the core 10*b* will not be reset during the spaces between power pulses of generator 16*b*, and the next pulse from that source will flow through coil 18*b* (this coil now having low impedance), both to reset output 45 and to input 20*a*. The flow of current to input 20*a* will pass through coil 21*a* and reset the core 10*a*, whereby coil 18*a* now has high impedance and prevents the next pulse from source 16*a* from flowing to either the set output 44 or to the primary 41. Consequently, by this time the flow of output pulses at set output 44 will have stopped and the pulses at reset output 45 will be resumed.

It follows that a set input pulse at 43 will cause a predetermined number of output pulses to appear at reset output 45 and a predetermined period of zero output at set output 44.

The device is non-resettable for the reason that if an additional set input pulse appears before the transformer core 40 reaches saturation, it will merely add to the amplitude of the pulse current induced in secondary winding 42 and will therefore have no noticeable effect. This follows because the current induced in coil 42 is resetting the core 10*b* and therefore additional set input current from terminal 43 which merely adds to the resetting current in winding 21*b* has no effect on the overall operation of the device. Moreover, there is a limited time period following the last set output pulse at 44 required before another set input pulse 43 will have the desired effect.

While the device shown in Figure 4 is a non-resettable delay flop, it could be modified, within the broadest aspects of the invention, so as to be resettable. One such modification would be to pass the set input current received at terminal 43 through a coil on the transformer 40 which would reset the core to point 14 on the hysteresis loop whenever a pulse was received at the input 43. However, an even better arrangement for securing a resettable delay flop is illustrated in Figure 4 where an "Alternate Set Input" 47 is shown. If this set input is employed the device will automatically reset itself since a pulse in that input 47 will not only flow through coil 21*b* (the same as previously described in the case of a pulse at set input 43), but will also flow through coil 42 in such direction as to cancel any decaying currents that may be flowing in coil 41 due to the pulses that may have just passed therethrough.

It is to be noted that I have shown a block diagram of the invention in Figure 3. The reason for showing this diagram is to evidence the fact that I am not limited to the specific forms of magnetic amplifiers shown in Figures 1 and 4. Any magnetic amplifiers capable of working together through a pulse transformer which is built up to saturation and thereby modifies the operation of the device is clearly contemplated by the broad showing in the block diagram of Figure 3. Again, Figure 3 may be regarded as a logical diagram of which the circuit of Figure 4 is only one of several concrete physical forms capable of embodying the invention. It is further understood that core material of the type described in connection with Figure 1 may be used in transformer 40 and the transformer operated somewhat like in the case of Robert D. Torrey, Serial No. 453,838, filed September 2, 1954, now Patent No. 2,792,506, entitled "Delay Flop." With a core of such square-looped material a series of pulses may be so related to a transformer as to drive the core along an unsaturated portion of the hysteresis loop and finally to saturation in step-by-step fashion. Hence, it would be possible to arrange the transformer 40 and the pulses so that the first few pulses do not saturate the core but a predetermined number of them will do so. In that case it is unnecessary for the pulses to have such a long decay time as to overlap.

It is understood that while I have described certain possible modifications of the invention, the invention in its broadest aspects is not limited to the specific devices shown in the drawings, but the scope thereof is defined in the appended claims in which generic terminology has been employed to include those other concrete physical forms which fall within the spirit of the invention.

I claim:

1. A delay flop comprising first and second pulse generators each of which produces spaced pulses that occur during the gaps between pulses of the other generator; first and second complementing magnetic amplifiers respectively fed with pulses from said two generators and which have outputs to which the pulses normally flow, the magnetic amplifiers each having a control input and including means to interrupt the flow of any pulse to the output if such pulse was preceded by a control pulse at the input of that magnetic amplifier; the delay flop having an input circuit feeding the input of the first magnetic amplifier; fedback means connecting the output of the first magnetic amplifier to the input of the second and the output of the second to the input of the first; said feedback means including means which interrupts the flow of pulses from the output of the second to the input of the first magnetic amplifier after a predetermined number of pulses has passed that path; the last-named means comprising a transformer having a primary and a secondary, a circuit connecting said primary to the output of the second magnetic amplifier and another circuit connecting the secondary to the input of the first magnetic amplifier, the first-named circuit including means for causing the current of each pulse to decay at such a slow rate that each pulse has greater amplitude than the preceding one until finally the core is saturated at which time there is no output from the secondary; and output means energized by the output of the second magnetic amplifier.

2. A delay device comprising in combination a first source of spaced pulses, a second source of spaced pulses displaced in time with respect to the pulses of said first source, a first magnetic amplifier connected to said first source and having an input and an output, a second magnetic amplifier connected to said second source and having an input and an output, a first circuit means connecting the output of said second amplifier to the input of said first amplifier, a signal input for the device and an output for the device, one of said circuit means comprising saturable means to control the passage of signals between said amplifiers, the last-named circuit means including means whereby after a predetermined flow of current therethrough the saturable means will become saturated and thus control the current in the last-named output.

3. The combination set forth in claim 2, said saturable means comprising a transformer having a primary winding connected to the output of one amplifier and a secondary winding connected to the input of the other amplifier.

4. The combination set forth in claim 3 in which said amplifiers are complementing magnetic amplifiers.

5. In combination, a first magnetic amplifier and a second magnetic amplifier, each of said amplifiers having an input and an output, a source of spaced pulses for energizing each amplifier whereby each said amplifier is adapted to produce a succession of output pulses, the pulses of one source being out of plane with respect to those of the other source, feedback means connecting the output of each said amplifier to the input of the other said amplifier, one of said feedback means comprising a saturable core transformer having its primary connected to the output of said first amplifier and its secondary connected to the input of said second amplifier, said core of said transformer being normally unsaturated and being responsive to a predetermined succession of pulses applied to the primary thereof whereby said transformer core is saturated after occurrence of said predetermined succession of pulses, said transformer being responsive to pulses applied to the primary thereof to produce pulses at the secondary thereof having an amplitude dependent upon the saturation state of said core, the output state of said second amplifier being responsive to the amplitude of input pulses applied to the input thereof from the secondary of said transformer whereby the output state of said second amplifier changes after occurrence of said predetermined succession of output pulses from said first amplifier.

6. In combination, a first complementing magnetic amplifier having an input, an output and a first source of spaced power pulses; a second complementing magnetic amplifier having an input, an output and a second source of spaced power pulses; the pulses of said first source being displaced in phase by substantially one hundred eighty degrees with respect to the pulses of said second source; the output of each amplifier being connected to the input of the other amplifier by circuit means, one of said circuit means comprising a saturable control reactor, said reactor being normally unsaturated and being responsive to occurrence of a predetermined number of pulses fed to said reactor from the output of said first amplifier to become saturated whereby outputs from said first amplifier are fed to the input of said second amplifier to inhibit said second amplifier until said reactor becomes saturated whereafter said second amplifier commences producing outputs to inhibit said first amplifier.

7. The combination set forth in claim 6, said saturable control reactor comprising a saturable core transformer having its primary winding connected to the output of one amplifier and its secondary winding connected to the input of the other amplifier.

8. The combination set forth in claim 2, said saturable means comprising a transformer having a saturable core, a primary winding connected to the output of one magnetic amplifier and a secondary winding connected to the input of the other magnetic amplifier said transformer being adapted to interrupt the flow of pulses transmitted thereby upon effective saturation of said core by the application of a pulse of predetermined amplitude to said primary.

9. A delay flop comprising means producing two series of spaced power pulses of opposite phase, two magnetic amplifiers each connected to receive one of said series of power pulses whereby said amplifiers selectively produce spaced output pulses of opposite phase, feedback means connecting the output of each amplifier to the input of the other, said feedback means comprising magnetic core means for changing the magnitude of feedback from a selected amplifier to the other after said selected amplifier has produced a predetermined plurality of output pulses.

10. A delay flop comprising in combination a first source of spaced pulses, a second source of spaced pulses displaced in time with respect to the pulses of said first source, a first magnetic amplifier connected to said first source and having an input and an output, a second magnetic amplifier connected to said second source and having an input and an output; a first circuit means connecting the output of one of said amplifiers to the input of the other amplifier; a second circuit means connecting the output of the said other amplifier to the said one of said amplifiers, one of said circuit means comprising magnetic core means for limiting the effective time period for the passage of signals from one amplifier to the other through said control means, a signal input and at least one signal output for said delay flop.

11. The combination set forth in claim 10, in which said amplifiers are complementing magnetic amplifiers.

12. In combination, a delay flop device comprising first means producing a train of spaced pulses, second means producing a train of spaced pulses of opposite phase, a first complementing magnetic amplifier connected to said first generator and having an input and an output, a second complementing magnetic amplifier connected to said second generator and having an input and an output, first feedback means connecting the output of said first amplifier to the input of said second amplifier, second feedback means connecting the output of said second amplifier to the input of said first amplifier, said first feedback means comprising means for changing the output of the device including a saturable transformer connected to receive an increasing saturating effect from each successive pulses output of said first amplifier and having a primary winding connected to the output of said first amplifier and a secondary winding connected to the input of said second amplifier, a set input for said device connected to said second amplifier, and an output for the device connected to the output of one of said amplifiers.

13. The combination set forth in claim 12 in which said first amplifier includes means which in combination with said first feedback means operates to extend the decay time of each pulse until the arrival of the next pulse so that the amplitude of each pulse is larger than the preceding pulse until finally the amplitude of the pulses is so large that the core is saturated.

14. A delay flop comprising amplifier means for producing a series of output pulses in response to a first input thereto, a saturable core reactor coupled to the output of said amplifier means, means cooperating with said amplifier means and with said reactor for progressively changing the saturating effect of each successive pulse from said amplifier means whereby said saturable core reactor becomes saturated after a series of pulses from said amplifier means, and means responsive to saturation to said saturable reactor for producing a second input to said amplifier means, said second input being operable to prevent the production of said output pulses.

15. In combination, first and second complementing amplifiers, means coupling the output of each of said amplifiers to the input of the other of said amplifiers whereby when either of said amplifiers is in an output producing state it inhibits an output from the other of said amplifiers, said coupling means including a saturable core reactor disposed between the output of one of said amplifiers and the input of said other amplifier, said reactor being operative to saturate after a continued output for a predetermined time from said one of said amplifiers thereby to remove said inhibition from the other of said amplifiers after said predetermined time.

16. In combination, a first amplifier including means for producing a train of output pulses, a second amplifier, means coupling the pulse outputs of said first amplifier to the input of said second amplifier thereby to control the output state of said second amplifier, said coupling means including a magnetic core normally having a selected saturation state, said core being responsive to a predetermined plurality of output pulses from said first amplifier for changing from said selected saturation state to a different saturation state, thereby to change the controlling input to said second amplifier, whereby the output state of said second amplifier changes after occurrence of said predetermined plurality of output pulses from said first amplifier.

17. The combination of claim 16 including further means coupling the output of said second amplifier to the input of said first amplifier whereby a change in the output state of said second amplifier effects a further change in the output state of said first amplifier.

18. In combination, a first amplifier having an input and an output, a saturable core reactor coupled to said input, input means comprising a second magnetic amplifier producing a train of regularly spaced input pulses to said first amplifier via said saturable core reactor thereby to control the output of said amplifier, said reactor being operative to saturate after a succession of said input pulses having been applied thereto for a length of time of corresponding to the occurrence time of a predetermined plurality of said input pulses to change the input to and output of said first amplifier.

References Cited in the file of this patent

UNITED STATES PATENTS

| | | |
|---|---|---|
| 2,113,011 | White | Apr. 5, 1938 |
| 2,276,680 | Allen | Mar. 17, 1942 |
| 2,652,501 | Wilson | Sept. 15, 1953 |
| 2,747,109 | Montner | May 22, 1956 |

OTHER REFERENCES

"Journal of Applied Physics," vol. 22 "A Magnetic Scaling Circuit," January 1951, pg. 107–108.

"A Review of Magnetic and Ferro-electric Computing Components" by V. L. Newhouse, published May 1954, "Electronic Engineering," pgs. 192–199.

UNITED STATES PATENT OFFICE

CERTIFICATE OF CORRECTION

Patent No. 2,901,635 August 25, 195

William F. Steagall

It is hereby certified that error appears in the printed specificatio of the above numbered patent requiring correction and that the said Letter Patent should read as corrected below.

Column 6, line 38, for "Serial No. 453,838" read -- Seri No. 453,833 --; line 69, for "fedback" read -- feedback --; column 7, line 40, for "plane" read -- phase --.

Signed and sealed this 13th day of September 1960.

(SEAL)
Attest:

KARL H. AXLINE
Attesting Officer

ROBERT C. WATSON
Commissioner of Paten